Patented May 12, 1942

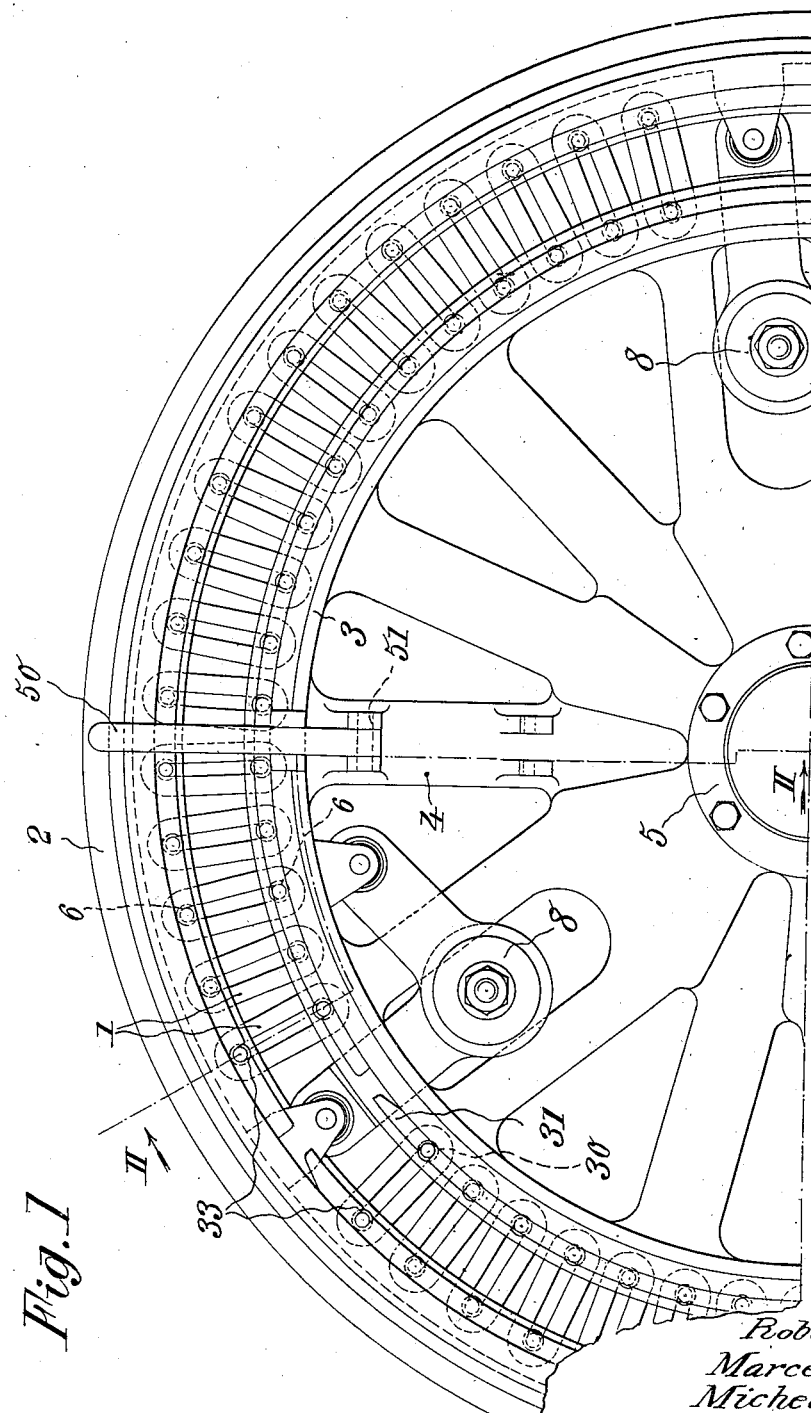

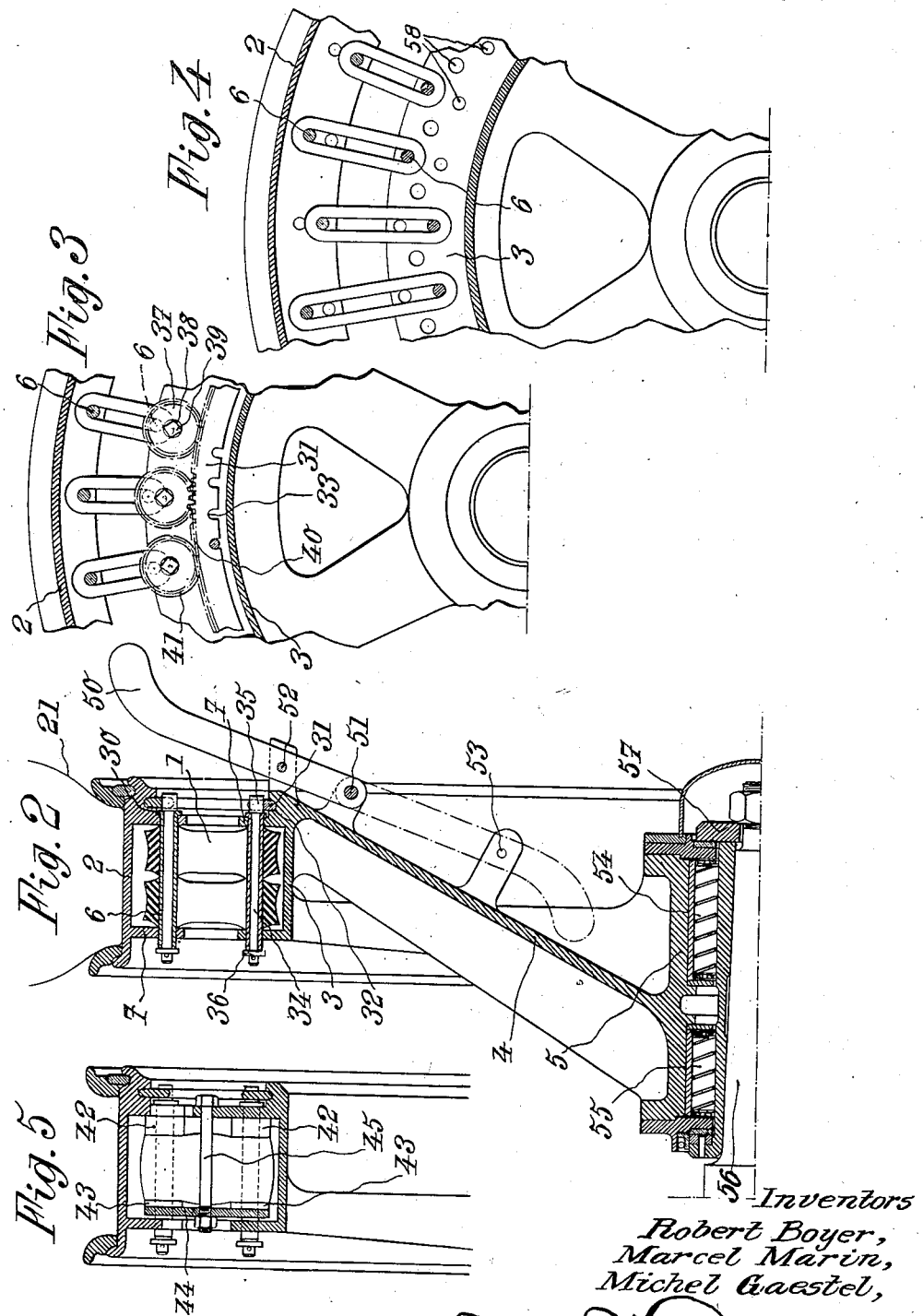

2,282,638

UNITED STATES PATENT OFFICE 2,282,638

ELASTIC WHEEL

Robert Boyer, Paris, Marcel Marin, Neuilly-sur-Seine, and Michel Gaestel, Arcueil, France, assignors to Société "Goodrich," S. A., Bois-Colombes, Seine, France, a society of France Application November 17, 1938, Serial No. 241,069
In Luxemburg November 20, 1937

2 Claims. (Cl. 152—40)

The present invention relates to devices of the kind of wheels, and especially those including at least two elements connected together by elastic members under tension, such as rubber rings engaged on pins carried by said elements respectively. The invention is more especially, although not exclusively, concerned, with elastic wheels for vehicles.

The chief object of the present invention is to provide devices of the type above described which are better adapted to meet the requirements of practice than the devices used for the same purpose up to the present time, and in particular devices such that the fitting of their elastic members is facilitated and further adapted to permit of adjusting at will the curve of flexibility corresponding to said members.

According to an essential feature of the present invention, the pins supporting the rubber members above referred to are arranged in such manner that they can be locked, at least at one of their ends, by means of rings or segments cooperating with a multiplicity of successive pins along the periphery of the wheel.

According to another feature of the present invention, the rubber rings are supported by pins, advantageously of tubular shape, extending through the lateral wings of rims of U-shaped or similar cross section.

According to still another feature of the present invention, the devices are arranged in such manner that the pins which support the rubber rings can be moved in such manner as to permit of adjusting the tension, said pins being, for instance, adaptable in different holes provided in the rims or other analogous elements, or said pins being carried by eccentrics or other equivalent devices.

Still another feature of the present invention consists in combining, to the elastic rings of said devices, means for simultaneously modifying the tension of a multiplicity of rubber rings, preferably the whole of said rubber rings.

Still another feature of the present invention consists in combining, with the elastic rings of said elements, means for opposing elastic deformations in the transverse direction, such means permitting, in particular a good resistance of the elements of the structure to transverse stresses.

Still another feature of the present invention consists in combining with the general structure elastic members, preferably of rubber, adapted to be compressed when the rubber rings expand, such a combination permitting to obtain any desired curve of flexibility.

Still another feature of the present invention relates in a general manner to wheels provided with means for manually turning them, in particular in the case of artillery vehicles, and it consists in constituting these means by operating arms adapted to occupy each two distinct positions, to wit a working position and a position in which the arm is retracted against the wheel body.

Other features of the present invention will result from the following detailed description of some specific embodiments thereof.

Preferred embodiments of the present invention will be hereinafter described, with reference to the accompanying drawings, given merely by way of example, and in which:

Fig. 1 is a partial view showing an elevation of an elastic wheel made according to a first embodiment of the present invention;

Fig. 2 is a sectional view on the line II—II of Fig. 1;

Fig. 3 is elevational view of another embodiment of the invention;

Fig. 4 is an elevational view of still another embodiment of the invention;

Fig. 5 is a transverse sectional view of a wheel made according to still another embodiment of the present invention.

In order to make a wheel including two concentric elements connected together by elastic rubber rings or the like, according to the present invention, we proceed in the following manner:

The general structure of the wheel is of any conventional or other type. The central element 4 is, for instance, constituted by a metallic web, eventually provided with apertures and advantageously rigid with hub 5, or even integral with said hub, as shown by the drawings. This central part carries, on its periphery, a first rim 3, whereas the external element is constituted by a second rim 2, connected to the first through rings 1 under tension. The outer rim can be fitted, on its periphery, with a tire, either of the solid type or of the pneumatic type, as shown at 21 by Fig. 2, or any other equivalent structure.

Concerning, more especially, the mounting of said rings on rims 2, 3, it is effected in such manner, according to one of the features of the invention, that the pins 6 on which said rings are stretched can be locked or clamped, at least at one of their ends, by means of rings or segments (or any other means performing the function which will be hereinafter described) capable of cooperating with a multiplicity of successive pins along the periphery of the wheel.

For instance, supposing that rims 2 and 3, according to an advantageous embodiment of the structure, have U-shaped sections, so that pins 6 can be engaged in holes provided in the sides of said rims, we proceed as follows:

Pins 6 consist, for instance, of tubular elements provided, at one of their ends, with a collar 30 forming a thrust shoulder.

We provide, on the side of the wheel which corresponds with these shoulders 30, segments 31 adapted to bear on said shoulders so as to lock the pins in position, said segments, once in position, concentrically with the axis of the wheel, being themselves locked on said rims 2 and 3.

For instance, we make use of two segments 31, corresponding respectively to rims 2 and 3, and preferably of the type of split and flexible rings, such as those utilized for fixing the holding circular members of pneumatic tires on standard rims.

Said rings or segments, which extend approximately over 360°, are advantageously fitted in grooves 32 provided in the rims. In order to lock them in position, they are for instance provided, at their opposite ends, with two notches 33, respectively, into which the locking members engage. Said locking members are, in the simple embodiment shown by the drawing, constituted by rods or pins 34 adapted to be engaged in corresponding tubular parts 6. These pins 34 are each provided, at one end, with an enlarged head 35 which engages in notch 33 and, at the other end, with a locking pin 36.

It will be readily understood that, owing to the above described arrangements, the replacement of any rubber ring 1 can be obtained through very simple operations: It suffices to remove locking pins 34, so as to release segments 31. The pins 6 of the various rubber rings are then accessible. The operation for bringing back the parts into locked position is quite as simple.

In Figs. 1 and 2, we have shown, concerning the rubber rings, an embodiment according to which two rings are juxtaposed along each pin 6, but of course many other arrangements may be employed, as it will be hereinafter explained.

According to another feature of the present invention, we provide means such that the tension of the rubber rings can be adjusted, so as to permit of varying at will the curve of flexibility, according to the kind of work to which the wheel is subjected.

For this purpose, we employ, for instance, for constituting said means, several series of holes 58 provided in the sides 7 of the rims and intended to receive pins 6, these series of holes permitting of choosing at will, concerning the flexibility, any of a multiplicity of different solutions (Fig. 4).

By giving said series of holes stepped arrangements with respect to one another, as shown by the drawings, it is even possible to modify at will the flexibility, by adding or removing rings.

Many other specific arrangements can be employed for the same purpose. For instance, as shown by Fig. 3, the pins 6 might be carried by supports capable of occupying various positions which accordingly vary the radial position of said pins. For instance, said pins are carried by eccentrics 37 pivoted about axes 38 and operable by means of a key engaging on a square pin 39.

Finally, it is advantageous to arrange said means in such manner that they permit of simultaneously adjusting a multiplicity of rings 1, and eventually the whole of said rings 1.

Such a result will be obtained, in particular, supposing that said eccentrics are employed, by simultaneously controlling all of these eccentrics by means of a toothed wheel 40 meshing with pinions 41 rigid with said eccentrics.

Said toothed wheel 40 will be preferably integral with a segment 31 such as above described, which segment is provided with several series of notches 33 capable of being adapted at will to the desired tension to be imparted to rings 1.

According to another feature of the invention, we combine, with the elastic means 1 which give the wheel its own elasticity, means for opposing any transverse deformation.

It is visible, on Figs. 1 and 2, that rings 1 tend, under the influence of the tension, to be flattened on their pins 6. The above mentioned means are intended to oppose such deformations.

For this purpose, for instance, rings 1 are subjected, at least over their portions close to pins 6 (said rubber rings 1 being preferably mounted at the rate of one ring per pin 6), to an initial compression, which can be obtained, in particular, either by providing on each of these pins 6, suitable tightening means, or by providing such tightening means for a group of pins 6.

We may also, according to the present invention, make the rings 1 of a material, of any known type, which deforms only in the longitudinal direction.

In Fig. 5, we have supposed, by way of example, that the various rings 1 were held tight, on the one hand between rings 42 bearing against one of the sides of rims 2, 3, and on the other hand rings 43 bearing against an annular part 44 combined with tightening means 45. Of course, said part 44 is provided, opposite pins 6, with wide apertures permitting free movements of rims 2, 3 with respect to each other.

Anyway, by opposing lateral deformations of rings 1, the lateral bracing of the wheel is improved.

Still according to a feature of the invention, applicable to any kind of wheels but more especially to those for artillery or agricultural vehicles intended to run on bad ground, the wheel is provided with operating arms which permit of manually turning it in case of great resistance and are arranged to be retracted under normal conditions.

As shown by Fig. 2, these arms 50 are, for instance, pivoted about spindles 51, and they can be keyed either at 52, in operating position, in which extending toward the outside, they permit of exerting powerful efforts, or at 53, in the retracted position, being then housed inside the central portion of the wheel, which is advantageously conical.

Finally, we may combine with the various preceding arrangements, taken either separately or in combination, other arrangements described in co-pending applications.

For instance, the wheel may be provided with shock absorbing means such as shown at 8 in Fig. 1, such means giving the wheel the qualities of a true suspension system.

The wheel may also include a hub 5 having multiple bearings, preferably of an elastic nature, for instance two bearings 54, 55, one of which, to wit 54 is a carrying bearing, being located in the plane of the efforts exerted on the wheel, while the other plays a stabilizing part, the whole being adapted to be clamped at the end of trunnion 56 by clamping means 57 occupying but little room.

Means may also be provided for permitting, when necessary, of coupling rims 2 and 3 together.

Whatever be the particular embodiment that is chosen, its operation results sufficiently clearly from the preceding explanations for making it unnecessary further to describe it.

Wheels of the type above described have, over wheels of this kind as made prior to our invention, many advantages among which the following may be cited:

The system is easy to operate.

Replacement of the elastic rings is extremely simple;

It is possible to remove the wheel together with its hub;

Any desired curve of flexibility can be obtained at will;

A perfect suspension is obtained.

The system according to the present invention can be applied to all kinds of vehicles, light or heavy. In particular, it is applicable to artillery or agricultural vehicles, for which wheels according to the invention will ensure a strong suspension, capable of resisting the stresses imposed by running on bad ground, while calling but for very simple operations by the men using such wheels.

The invention is further applicable to elastic pulleys or fly-wheels which would permit of automatically regulating the tension of belts, chains, or the like and avoiding shocks in transmissions, and also to rollers or friction wheels for transmissions, to elastic couplings between two shafts, the central portion of the device being then fixed to one of the shafts and the outer portion to the other shaft.

In a general manner, while we have, in the above description, disclosed what we deem to be practical and efficient embodiments of the present invention, it should be well understood that we do not wish to be limited thereto as there might be changes made in the arrangement, disposition, and form of the parts without departing from the principle of the present invention as comprehended within the scope of the accompanying claims.

What we claim is:

1. A structure which comprises, in combination, at least two circular elements of different respective diameters arranged in concentric relation with respect to each other, two series of transverse pins carried by said elements respectively, elastic members interposed under tension between one pin of a series and a corresponding pin of the other series, supports pivotally mounted on said circular elements about axes parallel to the common axis of said elements carrying in eccentric positions said pins, respectively, and means for adjusting the angular position of each of said supports with respect to the corresponding element.

2. A structure which comprises, in combination, at least two circular elements of different respective diameters arranged in concentric relation with respect to each other, two series of transverse pins carried by said elements respectively, elastic members interposed under tension between one pin of a series and a corresponding pin of the other series, supports pivotally mounted on said circular elements about axes parallel to the common axis of said elements, carrying said pins in eccentric position thereon, respectively, and means for simultaneously controlling the angular positions of a plurality of said supports on the corresponding circular element.

ROBERT BOYER.
MARCEL MARIN.
MICHEL GAESTEL.